June 11, 1974 A. BUZZI Re. 28,038

BODY SUPPORT DEVICE

Original Filed Aug. 23, 1968

United States Patent Office

Re. 28,038
Reissued June 11, 1974

28,038
BODY SUPPORT DEVICE

Angelo Buzzi, Rome, Italy, assignor to Christian Holzapfel KG, Ebhausen, Germany Original No. 3,541,313, dated Nov. 17, 1970, Ser. No. 754,849, Aug. 23, 1968. Application for reissue Mar. 9, 1972, Ser. No. 233,336
Claims priority, application Italy, Aug. 31, 1967, 16,217/67
Int. Cl. A47c *7/50;* B62j *1/00*
U.S. Cl. 297—195 5 Claims

Matter enclosed in heavy brackets [ ] appears in the original patent but forms no part of this reissue specification; matter printed in italics indicates the additions made by reissue.

ABSTRACT OF THE DISCLOSURE

A [piece of furniture] *body support device* to sit on has a saddle-shaped seat which is inclined in one direction and a pair of knee supports located on both sides of the seat which are inclined in the opposite direction.

This invention relates to [furniture] *a body support device* and specifically to [furniture] *a body support device* to sit on, like a stool or bench, having a seat mounted on a support; said support may include a plurality of legs or a supporting column with suitable legs.

It is known that faulty body posture and sickness resulting therefrom are very frequently found with persons engaged in [sedatory] *sedentary* work. A number of propositions have been made to improve the body posture of such persons by improving the construction of [the respective] furniture and actually a number of unusual constructions in this field have been put on the market.

These new constructions, however, are in many instances concerned with the aesthetic aspect of the [respective] furniture and [refer] *relate* mostly to furniture which is not meant to be used, for instance, by workers doing their work at a working table or the like.

It is an object of the present invention to provide a [piece of furniture] *body support device* for sitting, specifically a stool, which not only will reduce fatigue but which will also offer sufficient freedom of movement for the upper part of the body of the user.

It is a further object of the invention to provide such a [piece of furniture] *body support device* which will have a pleasing form and which is suited to be nested with other such [pieces of furniture] *devices* for storing. The [stool] *device,* according to the invention, is constructed in such a way that the spine of the person sitting thereon is supported by the pelvis and that the stomach region of said person is not compressed.

The [stool] *device,* according to the invention, is provided with a saddle shaped seat and two support platforms located at a lower level on each side of the seat and arranged to support the knees of the seated person.

It is preferable to have the ridge of the saddle shaped seat inclined downward in the direction in which the seated person is facing, whereas the two knee supports are inclined downward in the opposite direction and are extended to provide also a support for the shins of the user. The line extending along the ridge of the seat and the line extending along the knee supports may form an angle of about 45°. Both the seat and specifically the knee and shin supports are padded in a manner generally known.

The body weight of a person using the [stool] *device,* according to the invention, is distributed to a number of surfaces. The way of seating made possible by the [stool] *device,* according to the present invention, is a synthesis between the kneeling rest position used, for instance, in many oriental countries and the sitting rest position generally used by western man. It is also possible to change from the combined sitting-kneeling position to a purely kneeling position and thus to relieve the respective muscles and to avoid fatigue.

The way of sitting, made possible by the [stool] *device* according to the present invention, is also advantageous for expectant mothers.

For better understanding of the invention, reference should be had to the accompanying drawing showing a preferred embodiment of the invention of which:

FIGS. 1–2 show a *body support device, in the form of a* stool with the supporting structure 1 having substantially a reversed U-shaped cross section.

The supporting structure may include four legs 2.

Figure 2:
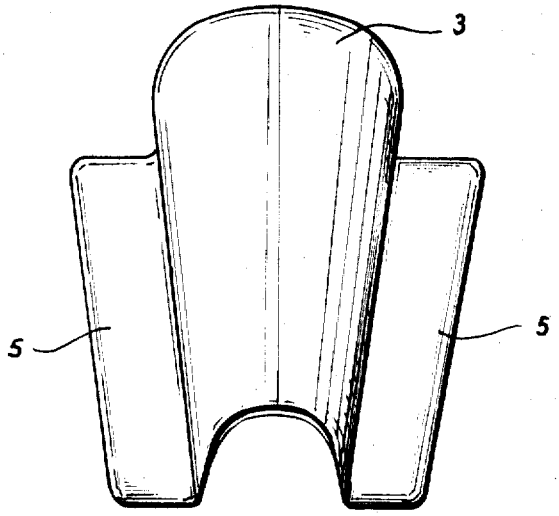
FIG. 2 is a plan of the [stool] *device* in accordance with FIG. 1.

The saddle shaped seat 3, disposed on the supporting structure, is padded and is wider in back than in front, as can be seen best in FIG. 2.

On both sides of the supporting structure 1 and below the level of the seat 3 are disposed two platforms 4, one on each side of the supporting structure 1. Each of the platforms 4 is equipped with a padding 5 and serves as knee and shin support for the user of the stool.

Figure 1:
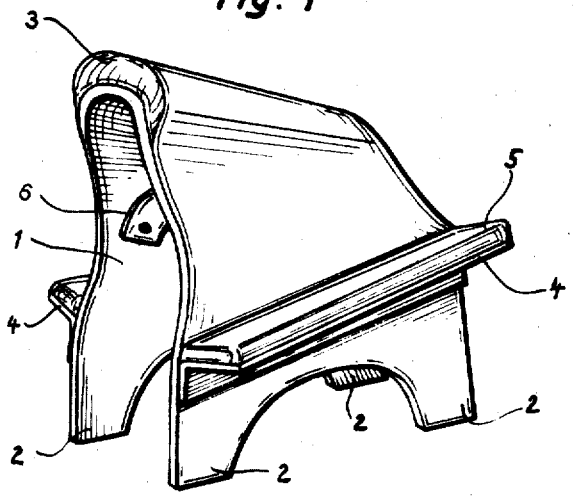
FIG. 1 is a perspective side view of a [stool] *device,* in accordance with the invention, showing also the construction of the back of the [stool] *device.*

As best can be seen in FIG. 1, the top of the saddle shaped seat 3 is inclined downward in the direction in which a person sitting thereon would face, whereas the padded platforms 4 are sloping upward in the same direction. Although the most comfortable angle of the inclination of the seat in relation to the platforms may vary, it has been found that an angle of about 45° is usually very comfortable to the user.

Advantageously, the seat 3 is widest in back and narrowest in front so that the highest part of the seat is at the same time the wider part thereof.

The supporting structure 1 may be of channel-like shape to facilitate the nesting of a number of stools.

Reinforcing strips 6 may be located on the inside of the supporting structure to improve the stability of the stool.

What is claimed is:

1. A [piece of furniture] *body support device* for sitting thereon comprising a support structure, a seat disposed on said structure at a first level and a pair of knee support platforms disposed on said support structure at a second level on both sides of said seat, said second level being lower than said first level, said support platforms being inclined upwardly in the direction in which a person using said seat is facing.

2. A [piece of furniture] *body support device* as set forth in claim 1 wherein the seat has a saddle-like shape and the ridge of said seat is inclined in a direction which is opposite to the direction of the inclination of the support platforms.

3. A [piece of furniture] *body support device* as set forth in claim 2 wherein the angle of inclination of the seat in relation to the knee support platforms is about 45°.

4. A [piece of furniture] *body support device* as set forth in claim 2 wherein said seat is widest at its higher end.

5. A [piece of furniture] *body support device* as set forth in claim 1 wherein said support structure is channel-shaped, having an inverted U-section for nesting a plurality of such furniture pieces.

References Cited

The following references, cited by the Examiner, are of record in the patented file of this patent or the original patent.

UNITED STATES PATENTS

| | | | |
|---|---|---|---|
| 3,037,570 | 6/1962 | Olsen | 297—423 X |
| 3,484,117 | 12/1969 | Lahti | 297—195 X |
| 48,638 | 7/1865 | Adams | 297—439 |
| 1,065,022 | 6/1913 | Bell | 297—195 X |
| 1,213,329 | 1/1917 | Beal | 54—44 |
| 1,620,448 | 3/1927 | Dourdoufis | 297—195 |
| 1,976,170 | 10/1934 | Hoover et al. | 297—439 X |
| 2,069,476 | 2/1937 | Keil | 297—439 X |
| 2,872,966 | 2/1959 | Chamness | 297—423 X |
| 3,284,988 | 11/1966 | Veach | 54—44 |

JAMES T. McCALL, Primary Examiner

U.S. Cl. X.R.

297—214, 423